US011403462B2

(12) United States Patent
Johnson

(10) Patent No.: US 11,403,462 B2
(45) Date of Patent: Aug. 2, 2022

(54) STREAMLINING DIALOG PROCESSING USING INTEGRATED SHARED RESOURCES

(71) Applicant: Oracle International Corporation, Redwood Shores, CA (US)

(72) Inventor: Mark Edward Johnson, Sydney (AU)

(73) Assignee: Oracle International Corporation, Redwood Shores, CA (US)

( * ) Notice: Subject to any disclaimer, the term of this patent is extended or adjusted under 35 U.S.C. 154(b) by 27 days.

(21) Appl. No.: 16/927,357

(22) Filed: Jul. 13, 2020

(65) Prior Publication Data

US 2021/0081609 A1  Mar. 18, 2021

Related U.S. Application Data

(60) Provisional application No. 62/899,651, filed on Sep. 12, 2019.

(51) Int. Cl.
*G06F 40/242* (2020.01)
*G06F 40/295* (2020.01)
(Continued)

(52) U.S. Cl.
CPC ............ *G06F 40/242* (2020.01); *G06F 40/30* (2020.01); *G10L 15/22* (2013.01)

(58) Field of Classification Search
CPC .............................. G06F 40/242; G06F 40/295
See application file for complete search history.

(56) References Cited

U.S. PATENT DOCUMENTS 9,484,021 B1  11/2016  Mairesse et al.
9,934,777 B1  4/2018  Joseph et al.
(Continued)

FOREIGN PATENT DOCUMENTS

JP    0827640 A    1/1996

OTHER PUBLICATIONS

Banarescu, et al., "Abstract Meaning Representation forSembanking", Proceedings of the 7th Linguistic Annotation Workshop and Interoperability with Discourse, Aug. 2013, 9 pages.
Chen, et al., "A fast and Accurate Dependency Parser Using Neural Networks", In Proceedings of the 2014 Conference on Empirical Methods in Natural Language Processing (EMNLP), Oct. 25-29, 2014, pp. 740-750.
(Continued)

*Primary Examiner* — Jialong He
(74) *Attorney, Agent, or Firm* — Kilpatrick Townsend & Stockton LLP

(57) ABSTRACT

Techniques for reducing memory and processing resources used by a dialog system by sharing resources between pipelined processes of the dialog system. An integrated shared dictionary is constructed for concurrent use by automated speech recognition (ASR) and natural language understanding (NLU) subsystems of the dialog system. The integrated shared dictionary comprises multiple entries, with each entry comprising first information that is used by the ASR subsystem, second information used by the NLU subsystem, and information correlating the first information and the second information. The ASR subsystem uses the integrated shared dictionary to identify a dictionary entry containing a set of words corresponding to speech input. The dictionary entry information is communicated to the NLU subsystem, which uses the entry to generate a meaning representation for the speech input. Sharing the dictionary between the subsystems results in significant savings in memory resources used by the dialog system and speeds processing.

14 Claims, 9 Drawing Sheets

(51) Int. Cl.
*G10L 15/22* (2006.01)
*G06F 40/30* (2020.01)

(56) References Cited

U.S. PATENT DOCUMENTS

| | | | | |
|---|---|---|---|---|
| 2004/0153306 | A1* | 8/2004 | Tanner | G06F 40/232 704/4 |
| 2014/0142922 | A1* | 5/2014 | Liang | G06F 40/295 704/9 |
| 2017/0278514 | A1* | 9/2017 | Mathias | G10L 15/22 |
| 2017/0287474 | A1* | 10/2017 | Maergner | G06F 40/211 |
| 2018/0068661 | A1* | 3/2018 | Printz | G06F 40/295 |

OTHER PUBLICATIONS

Desot, et al., "SLU for Voice Command in Smart Home: Comparison of Pipeline and End-to-End Approaches", Institute of Electrical and Electronics Engineers Automatic Speech Recognition and Understanding Workshop (ASRU), Dec. 14-18, 2019, 9 pages.

Dugas, et al., "DeepNNNER: Applying BLSTM-CNNs and Extended Lexicons to Named Entity Recognition in Tweets", Proceedings of the 2nd Workshop on Noisy User-Generated Text (WNUT), Dec. 2016, 10 pages.

Finkel, et al., "Joint Parsing and Named Entity Recognition", Proceedings of Human Language Technologies: The 2009 Annual Conference of the North American Chapter of the Association for Computational Linguistics, Jun. 2009, pp. 326-334.

Haghani, et al., "From Audio to Semantics: Approaches to End-to-End Spoken Language Understanding,", Available online at: https://arxiv.org/abs/1809.09190, Sep. 24, 2018, 7 pages.

Kurata, et al., "IBM Research Advances in End-to-End Speech Recognition at INTERSPEECH 2019", IBM Research Blog, Available Online at: https://www.ibm.com/blogs/research/2019/10/end-to-end-speech-recognition/, Oct. 18, 2019, 11 pages.

Liang, "Lambda Dependency-Based Compositional Semantics", Sep. 18, 2013, 7 pages.

Lugosh, et al., "Speech Model Pre-training for End-to-End Spoken Language Understanding", Available online at: https://arxiv.org/pdf/1904.03670.pdf, Jul. 25, 2019, 5 pages.

Maas, et al., "Lexicon-Free Conversational Speech Recognition with Neural Networks", Proceedings of the 2015 Conference of the North American Chapter of the Association for Computational Linguistics: Human Language Technologies, May-Jun. 2015, pp. 345-354.

Morbini, et al., "A Reranking Approach for Recognition and Classification of Speech Input in Conversational Dialogue Systems", Institute of Electrical and Electronics Engineers Spoken Language Technology Workshop (SLT), Dec. 2-5, 2012, 6 pages.

Palogiannidi, et al., "End-to-end Architectures for Asr-free Spoken Language Understanding", Oct. 23, 2019, 5 pages.

Wang, et al., "Improving Spoken Dialogue Understanding Using Phonetic Mixture Models", Proceedings of the Twenty-Fourth International Florida Artificial Intelligence Research Society Conference, 2011, pp. 329-334.

Yao, et al., "Sequence-to-Sequence Neural Net Models for Grapheme-to-Phoneme Conversion", Available Online at: https://www.microsoft.com/en-us/research/wp-content/uploads/2016/02/rnnlts.pdf, Aug. 20, 2015, 5 pages.

Yin, et al., "A Syntactic Neural Model for General-Purpose Code Generation", Proceedings of the 55th Annual Meeting of the Association for Computational Linguistics, vol. 1, Apr. 6, 2017, 14 pages.

Zheng, et al., "Intent Detection and Semantic Parsing for Navigation Dialogue Language Processing", Institute of Electrical and Electronics Engineers 20th International Conference on Intelligent Transportation Systems (ITSC), Oct. 16-19, 2017, pp. 1290-1295.

K. W. Church, Phonological Parsing in Speech Recognition, Kluwer Academic Publishers, Boston, 1987, pp. 1-40.

* cited by examiner

| Words 302 | Pronunciation 304 | Named Entity Type 306 |
|---|---|---|
| 308 — Sydney Harbour Bridge | S I D N I . H AA B A . B R I DG | Point-of-Interest 312 |
| 314 — Opera House | O P R A . H AU S 316 | Point-of-Interest 318 |
| ... | ... 310 | ... |

FIG. 3A

| Words 352 | Pronunciation 354 | Named Entity Type 356 | Supplemental Information 358 |
|---|---|---|---|
| Washington | WASH . ING. TOHN 364 | Person 366 | George Washington, First President of United States 368 |
| Washington | WASH . ING. TOHN | City 376 | Capital of United States; 38.9072° N, 77.0369° W — 378 |
| Washington | WASH . ING. TOHN 364 | State 386 | State in Northwestern United States; 47.7511° N, 120.7401° W — 388 |
| ... | ... | ... | ... |

FIG. 3B

STREAMLINING DIALOG PROCESSING USING INTEGRATED SHARED RESOURCES

CROSS-REFERENCE TO RELATED APPLICATIONS

The present application claims the benefit and priority under 35 U.S.C. 119(e) of U.S. Application No. 62/899,651, filed on Sep. 12, 2019, entitled "TECHNIQUES FOR INTEGRATING THE EXECUTION PIPELINE OF A DIALOG SYSTEM," the content of which is herein incorporated by reference in its entirety for all purposes.

TECHNICAL FIELD

The present disclosure relates generally to dialog systems. More specifically, but not by way of limitation, this disclosure describes techniques for reducing the amount of memory and processing resources used by a dialog system by enabling sharing of resources between pipelined processes of the dialog system.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

The ability to interact with a device using spoken speech is facilitated by a dialog system (also sometime referred to as a chatbot or a digital assistant), which may be in the device. A dialog system typically uses a pipeline of multiple processes implemented by independent components. This pipeline includes an automated speech recognition (ASR) component, which receives the speech uttered by a user as input and identifies words corresponding to the speech utterances (e.g., converts speech to text). The output of the ASR component is provided to a natural language understanding (NLU) component, which processes the text to determine its meaning, which may include performing intent and named entity identification from the text. The output of the NLU component provides information about the intent behind the user utterance and entities that are relevant to the intent. Conventionally, each of the ASR and NLU components has their own resources (e.g., computer, memory, data structures, etc.) for performing their corresponding tasks. This makes it difficult for such dialog systems to be incorporated into low-power and resource-deficient devices such as kitchen appliances, lights, etc.

BRIEF SUMMARY

The present disclosure relates generally to dialog systems. More particularly, techniques are described for sharing resources between speech recognition and natural language understanding subsystems in a dialog system, which can reduce compute times and memory requirements. In particular, a first subsystem performing automated speech recognition operations and a second subsystem performing natural language understanding operations use an integrated shared dictionary to discern meaning from speech input. Various embodiments are described herein, including methods, systems, non-transitory computer-readable storage media storing programs, code, or instructions executable by one or more processors, and the like.

In certain embodiments, a dialog system generates a meaning representation based on speech input received from a user. The system may use Automated Speech Recognition (ASR) and Natural Language Understanding (NLU) to generate the meaning representation. The system may use a common integrated shared dictionary for ASR and NLU functions. Such a dictionary may include words, pronunciations, and information associated with the words, which may include named entity types or other information useable for determining a meaning representation. The integrated shared dictionary may be used to streamline dialog processing using integrated shared resources and processing.

In certain embodiments, a first subsystem of a dialog system receives speech input. The first subsystem processes the speech input to identify a pronunciation corresponding to the speech input. The first subsystem searches a dictionary stored in a memory to find a matching entry in the dictionary corresponding to the identified pronunciation, the dictionary comprising a plurality of entries, each entry in the plurality of entries storing a set of one or more words mapped to a pronunciation stored in the entry, each entry in the plurality of entries further comprising additional information usable for determining a meaning representation for the set of one or more words stored by the entry. The first subsystem communicates, to a second subsystem of the dialog system, information identifying the matching entry. The second subsystem generates a meaning representation for the speech input using the information identifying the entry, the meaning representation identifying an intent associated with the speech input, wherein the generating comprises using, by the second subsystem, the additional information stored in the matching entry in the dictionary.

In some aspects, the first subsystem is an Automated Speech Recognition (ASR) subsystem and the second subsystem is a Natural Language Understanding (NLU) subsystem. In some aspects, the information indicating the entry comprises a pointer to the additional information and the second subsystem of the dialog system uses the pointer to retrieve the additional information. In some aspects, the additional information comprises a named entity type corresponding to the set of words and generating the meaning representation comprises linking the named entity type to the set of words.

In some aspects, the set of words is a first set of words and the method further comprises identifying, by the first subsystem of the dialog system using the dictionary, a second set of words; outputting, by the first subsystem of the dialog system to the second subsystem of the dialog system, the second set of words; and determining, by the second subsystem of the dialog system, a context by associating the words, of the first set of words and the second set of words, with one another using a machine learning model.

In some aspects, the method further comprises outputting, by the second subsystem of the dialog system to a third subsystem of the dialog system, the generated meaning representation. In some aspects, the method further comprises identifying information used by the first subsystem, identifying information used by the second subsystem, determining information correlating the information used by the first subsystem and the information used by the second subsystem, generating the dictionary used by the first subsystem, the information used by the second subsystem, and the correlating information, and making the dictionary accessible by the first subsystem and the second subsystem.

Embodiments further include systems and computer-readable media configured for performing the methods described herein.

The foregoing, together with other features and embodiments will become more apparent upon referring to the following specification, claims, and accompanying drawings.

BRIEF DESCRIPTION OF THE DRAWINGS

FIGS. 3A-3B depict example integrated ASR/NLU dictionary entries according to certain embodiments.

DETAILED DESCRIPTION

Figure 1:
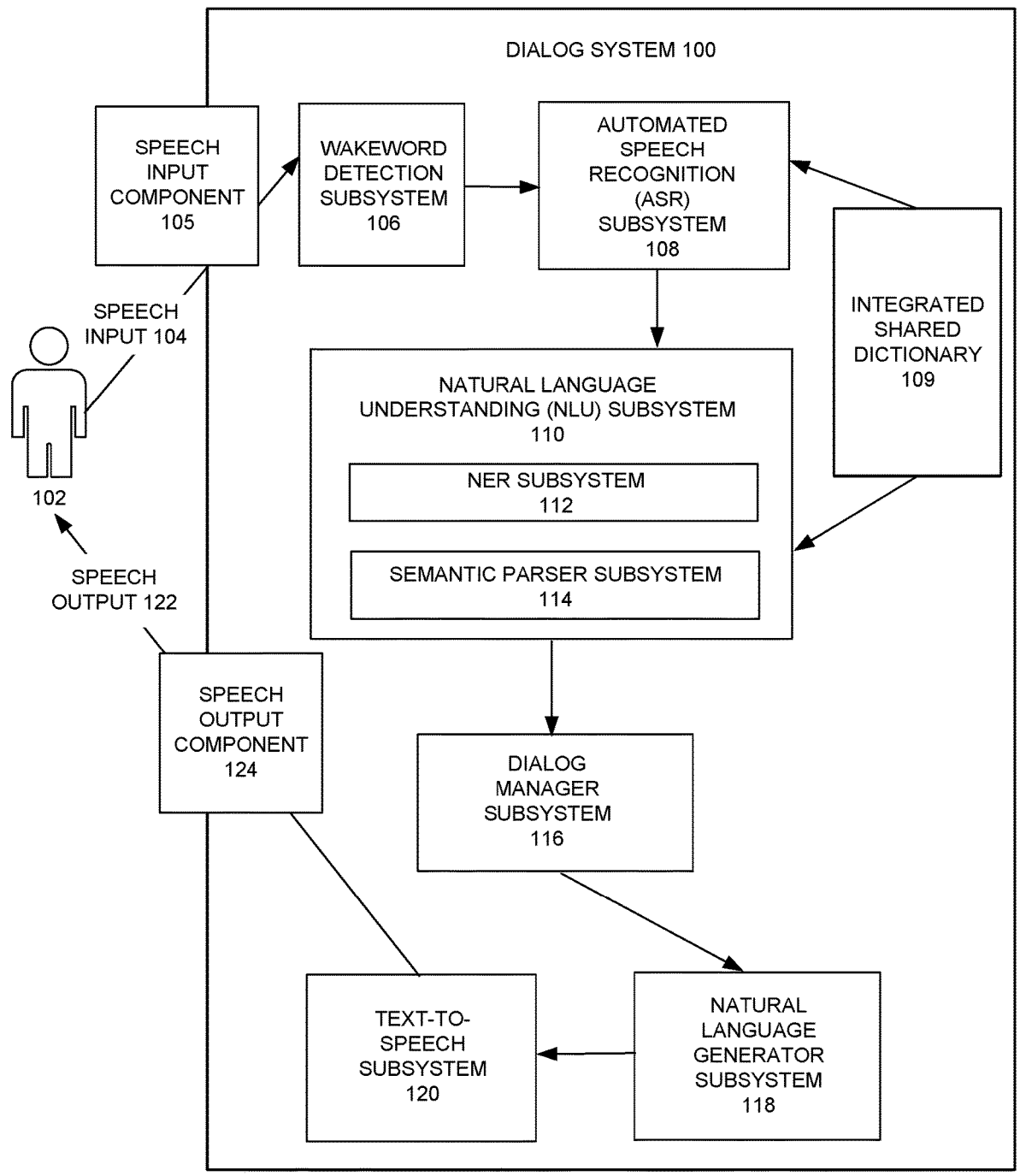
FIG. 1 is a simplified block diagram illustrating a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system"). Various terms are used to refer to such a dialog system, such as a chatbot or chatbot system, a digital assistant, and the like.

Processing performed by a dialog system typically involves a pipeline of multiple processes. As noted above, these processes may include performing automated speech recognition (ASR) on speech input representing utterances spoken by a user, where the ASR processing identifies words corresponding to the speech utterances (e.g., converts speech to text). The output of the ASR processing is then provided as input to natural language understanding (NLU) processing which processes the text words and identifies one or more intents and named entities from the text words. The ASR and NLU processing tasks are performed by discrete components (e.g., modules that operate independently of one another), each with their own processing and memory resources. Separate ASR and NLU systems require coordination, which can be computationally expensive in terms of time and memory. Each system uses its own resources (e.g., model (e.g., a machine learning model), data structures, dictionaries, etc.) to perform the processing. For example, ASR systems use a dedicated dictionary (also referred to as a lexicon) to map speech input to text. Natural Language Processing (NLP) systems use a gazette (also referred to as a gazetteer) to identify a meaning representation for a given text.

The present disclosure describes techniques for reducing the amount of memory and processing resources used by a dialog system by enabling sharing of resources between pipelined processes of the dialog system. An integrated shared dictionary is constructed such that it can be shared by and used concurrently by multiple subsystems of the dialog system. The integrated shared dictionary is shared by the automated speech recognition (ASR) and natural language understanding (NLU) subsystem of the dialog system. The integrated shared dictionary comprises multiple entries, with each entry comprising first information that is used by the ASR subsystem and second information used by the NLU subsystem and information correlating the first information and the second information. The ASR subsystem uses the integrated shared dictionary to identify a dictionary entry containing a set of words corresponding to a speech input. The dictionary entry information is then communicated to the NLU subsystem, which uses the entry to generate a meaning representation for the speech input. This sharing of the integrated shared dictionary between the ASR and NLU subsystems results in significant savings in memory resources used by the dialog system and also makes the processing faster.

In some embodiments, an integrated shared dictionary is constructed such that it can be shared by and used concurrently by the ASR and NLU subsystems of the dialog system. In certain embodiments, the ASR subsystem, as part of its speech-to-text processing, may use the integrated shared dictionary to determine a location (e.g. an entry in a table) in the dictionary identifying a set of words corresponding to a speech utterance. The ASR subsystem may then output and pass a pointer to this location to the NLU subsystem for its processing. The NLU subsystem then uses this pointer into the integrated shared dictionary to perform its processing to determine a meaning for the set of words identified by the ASR subsystem. In certain embodiments, determining the meaning includes determining information identifying one or more intents, one or more named entities type and/or additional supplemental information about the identified words corresponding to the user speech utterance.

The integrated shared dictionary may come in multiple different forms. The processing performed by the ASR subsystem involves receiving speech input (e.g., a spoken user utterance) and determining a set of text words corresponding to the utterance. As part of its processing the ASR subsystem determines the pronunciation of the speech input and then determines a set of words corresponding to the pronunciation. The NLU subsystem determines a meaning representation for the set of words determined by the ASR subsystem. As part of its processing, the NLU subsystem extracts one or more named entities and other information from the set of text words and then determines one or more intents for the set of words (and accordingly for the speech input) based upon the extracted information. Accordingly, in certain embodiments, the integrated shared dictionary includes information mapping pronunciations to sets of words, and words to meaning representations, where a meaning representation may include one or more named entities, intents, and other information.

Using an integrated shared dictionary between the ASR and NLU components provides several technical advantages over conventional techniques. The overall memory footprint of the dialog system is reduced. A single dictionary used by the ASR and NLU subsystems occupies less memory than a separate dictionary and gazette used by the ASR and NLU subsystem, respectively, conventionally. By storing one dictionary instead of two, storage requirements of the dialog system are reduced. The total memory size of the ASR and NLU components themselves is also reduced.

The processing time taken for processing the speech input is also reduced leading to reduced total response latency of the dialog system (e.g., the total amount of time required to transform the input speech waveform into a meaning representation for the input). Conventionally, the ASR subsystem would perform a lookup in its dictionary and the NLU subsystem would perform another lookup in it gazette. The use of an integrated shared dictionary enables the processing to be performed using a single lookup. The ASR subsystem performs the lookup and then passes a pointer to the relevant location in the integrated shared dictionary to the ASR subsystem, which then uses this pointer to perform its processing. This obviates the need for the NLU subsystem to perform a second gazette lookup, which reduces the overall processing performed and the time taken for the processing.

Dialog systems can be quite complex, yet it is desirable to implement such systems on small computers and devices such as embedded systems like alarm clocks, household appliances, etc. with reduced power, processing, and memory resources. Conventionally, such devices could not support dialog systems, or could only support them with the help of additional servers coupled to the devices. This can enable the dialog system to be implemented on a lower-power or less costly device. By reducing both the processing and storage requirements of the dialog system using an integrated shared dictionary, the memory storage requirement can be reduced by as much as 50% and even more. This enables a dialog system to be implemented in embedded systems, and without the need to use any external server for storage or processing. Alternatively, in embodiments in which an external server is leveraged for storage and/or processing, the reduction in processing and storage requirements is also advantageous. Sharing resources between the ASR and NLU components can further reduce the effort required to construct a conversational agent. If the ASR and NLU components each have their own versions of the dictionaries and gazetteers, then in general each version needs to be separately constructed and maintained, which multiplies computing resources and labor. If resources such as dictionaries or gazetteers are shared between the ASR and NLU components, then only one version of each needs to be constructed and maintained, which can reduce the resources required to construct and maintain the overall system by 50% or more.

FIG. 1 illustrates an example of a dialog system 100, according to some embodiments. The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output.

In certain embodiments, the processing performed by a dialog system is implemented by a pipeline of components or subsystems, including a speech input component 105, a wake-word detection (WD) subsystem 106, an automatic speech recognition (ASR) subsystem 108, an integrated shared dictionary 109, a natural language understanding (NLU) subsystem 110, which includes a named entity recognizer (NER) subsystem 112 and a semantic parser subsystem 114, a dialog manager (DM) subsystem 116, a natural language generator (NLG) subsystem 118, a text-to-speech (TTS) subsystem 120, and a speech output component 124. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The integrated shared dictionary 109 includes a common set of linguistic resources used by the ASR and NLU subsystems. The set of linguistic resources may include dictionary entries mapping pronunciations to words. The set of linguistic resources may further include entries specifying a set of named entities, and/or additional information that can be used by the NLU subsystem 110 for determining a meaning representation for words. The ASR subsystem 108 may identify information identifying an entry in the integrated shared dictionary 109 (e.g., pointers to such information usable by the NLU subsystem 110) and pass the information to the NLU subsystem 110 as output.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form. The NLU subsystem 110 may further use information passed from the ASR subsystem 108 to rapidly obtain information from the integrated shared dictionary 109 for use in generating the logical form, as described herein.

In certain implementations, the NLU subsystem 110 includes a named entity recognizer (NER) subsystem 112 and a semantic parser (SP) subsystem 114. The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed. In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 110 can identify the intent order pizza. The NLU subsystem can also identify and fill slots, e.g., pizza size (filled with large) and pizza toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. In certain embodiments machine learning based techniques (e.g., machine learning models) may also be used. In some embodiments, a combination of rules and machine learning models may be used. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

ASR pronunciation dictionaries are used to perform ASR functions. ASR pronunciation dictionaries used for ASR include pronunciations and corresponding words. For example, an ASR dictionary maps a phonetic representation of a word to a text string of the word. The text string of the word specifies how the word is spelled. As a specific example, an entry in an ASR pronunciation dictionary specifies:

G OW L D AH N . G EY T . B R IH JH . ↔GOLDEN GATE BRIDGE

NLU operations may be performed using named entity gazettes. Named entity gazettes map words (e.g., text strings) to specific named entity types, or categories of named entities. These gazettes can be used by an NLU system to fill slots to help determine how to process a user request. For example, an entry in a named entity gazette may link the phrase Golden Gate Bridge to a named entity type:

GOLDEN GATE BRIDGE↔Point-of Interest

Typically, an NLU gazette does not include pronunciation.

As described above, NLU may be used to identify a meaning representation. For example, text data is analyzed by one or more machine learning algorithms to identify a representation of the meaning of a set of words spoken by a user. The meaning representation may include an intent, such as obtaining directions or information. Words or groups of words may be linked to named entity types. For example, the text "find an Indian restaurant near the beach" maps to INTENT: Find Restaurant; CUISINE: Indian; LOCATION: Beach. CUISINE and LOCATION are named entity types, and Indian and Beach are the words linked to the named entity types (e.g., the corresponding named entities). By converting the text to machine-recognizable intents and named entities, the machine can process the request provided by the user.

Figure 2:
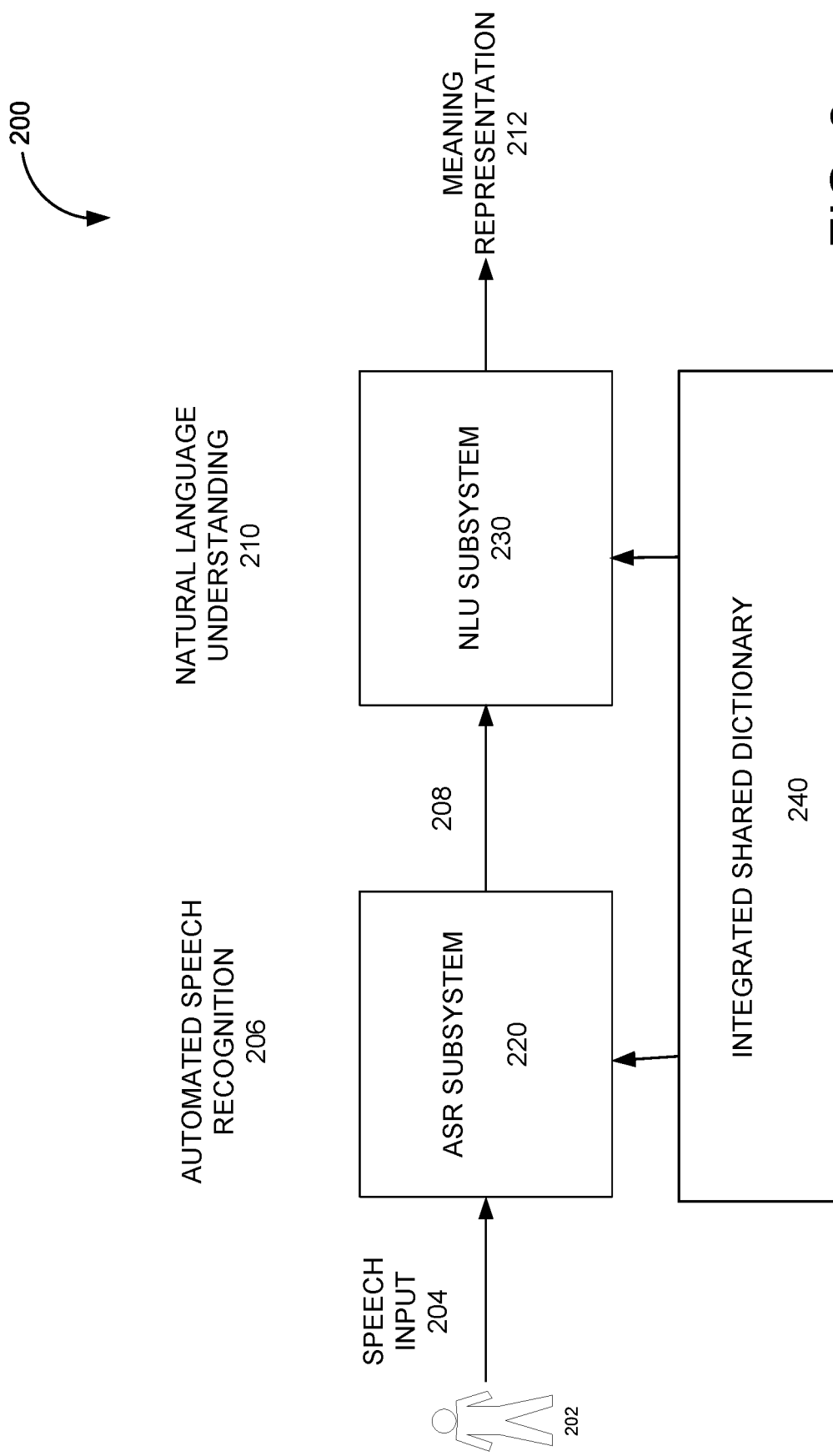
FIG. 2 is a simplified schematic diagram illustrating a method for generating a meaning representation from speech input via an ASR/NLU pipeline using an integrated shared dictionary according to certain embodiments.

FIG. 2 is a schematic diagram illustrating an overview of techniques 200 for generating a meaning representation 212 from speech input 204 using an ASR subsystem 220 and a NLU subsystem 230 using an integrated shared dictionary 240 according to certain embodiments. The speech input 204 is received from a user 202. The speech input 204 may be received as a wave form. The received speech input 204 is analyzed by a system comprising an ASR subsystem 220 and an NLU subsystem 230 using the integrated shared dictionary 240. The ASR subsystem 220 and the NLU subsystem 230 may be implemented in a pipeline architecture. The ASR subsystem 220 may correspond to the ASR subsystem 108 of FIG. 1, the NLU subsystem 230 may correspond to the NLU subsystem 110 of FIG. 1, and the integrated shared dictionary 240 may correspond to the integrated shared dictionary 109 of FIG. 1.

At 206, the ASR subsystem 220 receives the speech input 204 and identifies words based on the speech input. The ASR subsystem may process the speech input to identify a representation of the sounds, which can correspond to pronunciations. The ASR subsystem may use the integrated shared dictionary 240 to identify words mapped to the pronunciations.

The integrated shared dictionary 240 includes a common set of linguistic resources used by the ASR and NLU subsystems. The set of linguistic resources may include dictionary entries mapping pronunciations to words, as can be used by the ASR subsystem 220. The set of linguistic resources may further map words to information for determining a meaning representation, such as a set of named entities, as can be used by the NLU subsystem 230. The set of named entities may correspond to all of the entities that the dialog system has learned. The entries may further include information about those named entities. For example, an entry might contain the named entity "Space Needle", together with information about the named entity such as the address of the Space Needle and the fact that the Space Needle is a popular tourist destination. A common integrated shared dictionary 240, as shown in FIGS. 3A and 3B, is generated with the information that both the subsystems need.

The ASR subsystem 220 identifies pronunciations for words using the integrated shared dictionary 240. For example, the ASR subsystem 220 identifies the pronunciation D ER EH K SH AH N Z . T UW. The ASR subsystem 220 identifies a corresponding dictionary entry with the words "directions to" mapped to the identified pronunciation. Based on the words identified in the dictionary, the ASR subsystem 220 transforms the speech waveform into a sequence of words. The output of the ASR subsystem 220 may include output 208 (e.g., a text string/text utterance) comprising one or more words.

In some embodiments, the ASR subsystem 220 produces information identifying an entry in the integrated shared dictionary 240. Such information may include pointers to entries in the integrated shared dictionary. For example, the ASR output for the spoken sentence "Take me to the Space Needle." might be "Take me to <NER id=27/>", where "<NER id=27/>" is an ASR output token that points to the named entity gazette entry for "Space Needle." The named entity gazette entry specifies that Space Needle corresponds to the named entity type point-of-interest. Accordingly, the output 208 of the ASR subsystem 220 may further include the information identifying the entry in the integrated shared dictionary 240.

At 210, the NLU subsystem 230 receives the output 208 and uses NLU to generate a meaning representation 212 associated with the speech input. The NLU subsystem generates the meaning representation 212 based on the information identifying the entry in the integrated shared dictionary 240 communicated by the ASR subsystem 220 and/or text output discerned by the ASR subsystem 220. In some embodiments, the NLU subsystem 230 determines the meaning representation based on the named entity type and an identified intent. For example, the identified intent is directions_to, a named entity Star Beach of the type location has been identified, and the meaning representation indicates the user has requested directions to Star Beach. The NLU subsystem may transform words identified by the ASR subsystem 220 into a representation of their meaning. The meaning representation may include one or more named entities. The NLU subsystem 230 may generate the meaning representation using the integrated shared dictionary 240 to match words to named entity types based on the words. This may be used to label the words with a named entity tag and/or additional information. The NLU subsystem 230 this meaning representation 212 to another component of the dialog system pipeline such as dialog manager subsystem 116 of FIG. 1.

Because the NLU subsystem 230 uses the integrated shared dictionary 240 with the ASR subsystem 220, the NLU subsystem 230 does not need to have a separate gazette, reducing the total memory requirements for the dialog system. By using the ASR subsystem 220 to directly produce pointers to gazette entries, the NLU subsystem 230 does not need to perform gazette lookup, which simplifies and speeds up the NLU processing. This also simplifies the construction of the dialog system overall because data and resources are shared between the ASR and NLU subsystem.

Accordingly, the use of an integrated shared dictionary can speed up operations, and reduce memory and computing requirements. This is particularly useful in systems implemented with relatively low computing resources, such as a very small computer, or embedded systems like alarm clocks or appliances. Given that the lists of words and named entities can be very large, storing and using one dictionary instead of multiple dictionaries provides efficiency that is particularly useful in such contexts.

FIGS. 3A-3B depict example integrated shared ASR/NLU dictionary entries according to certain embodiments FIG. 3A illustrates an example dictionary 300 including words 302, pronunciations 304, and named entity types 306. The words 302 entries include sets of one or more words. The sets of words include Sydney Harbour Bridge 308 and Opera House 314. The dictionary 300 further includes pronunciations 304. Pronunciations are the speech sounds that make up words. The pronunciations are represented in a phonetic representation understandable by the dialog system. The pronunciations 304 are mapped to the corresponding words. SIDNI . HAABA . BRIDG 310 is the pronunciation mapped to the set of words Sydney Harbour Bridge 308. OPRA . HAUS 316 is the pronunciation mapped to the set of words Opera House 314. The dictionary 300 further includes named entity types 306. Named entity types 306 specify a category of named entity, such as person, location, and so forth. Sydney Harbour Bridge 308 is of the named entity type 306 point-of-interest 312. Opera House 314 is also of the named entity type 306 point-of-interest 318.

FIG. 3B illustrates an example dictionary 350 including words 352, pronunciations 354, named entity types 356, and supplemental information 358. The words 352 entries include sets of one or more words. The word Washington 360 is shown in three entries. The word Washington 360 is mapped to the pronunciation 354 WASH . ING . TOHN 364. The word Washington 360 is further mapped to information about the word, which includes named entity types 356 and supplemental information 358. In this case, there are multiple meanings of Washington—the first president of the United States, the Capital of the United States, and a state in the Northwestern United States. The dictionary 350 includes entries for each of the three possibilities—named entity types 356 person 366, city 376, and state 386 respectively. For each named entity type 356, the dictionary 350 further includes supplemental information 358 that may be useful in determining context for the word and/or for preparing a response associated with the word. For Washington 360 the person 366, the supplemental information is "George Washington, First President of the United States" 368. For Washington 360 the city 376, the supplemental information is "Capital of the United States; 38.9072° N, 77.0369° W" 378, which includes the location coordinates of the city. For Washington 360 the state 386, the supplemental information is "State in Northwestern United States; 47.7511° N, 120.7401° W" 388, which includes the location coordinates of the state.

Figure 4:
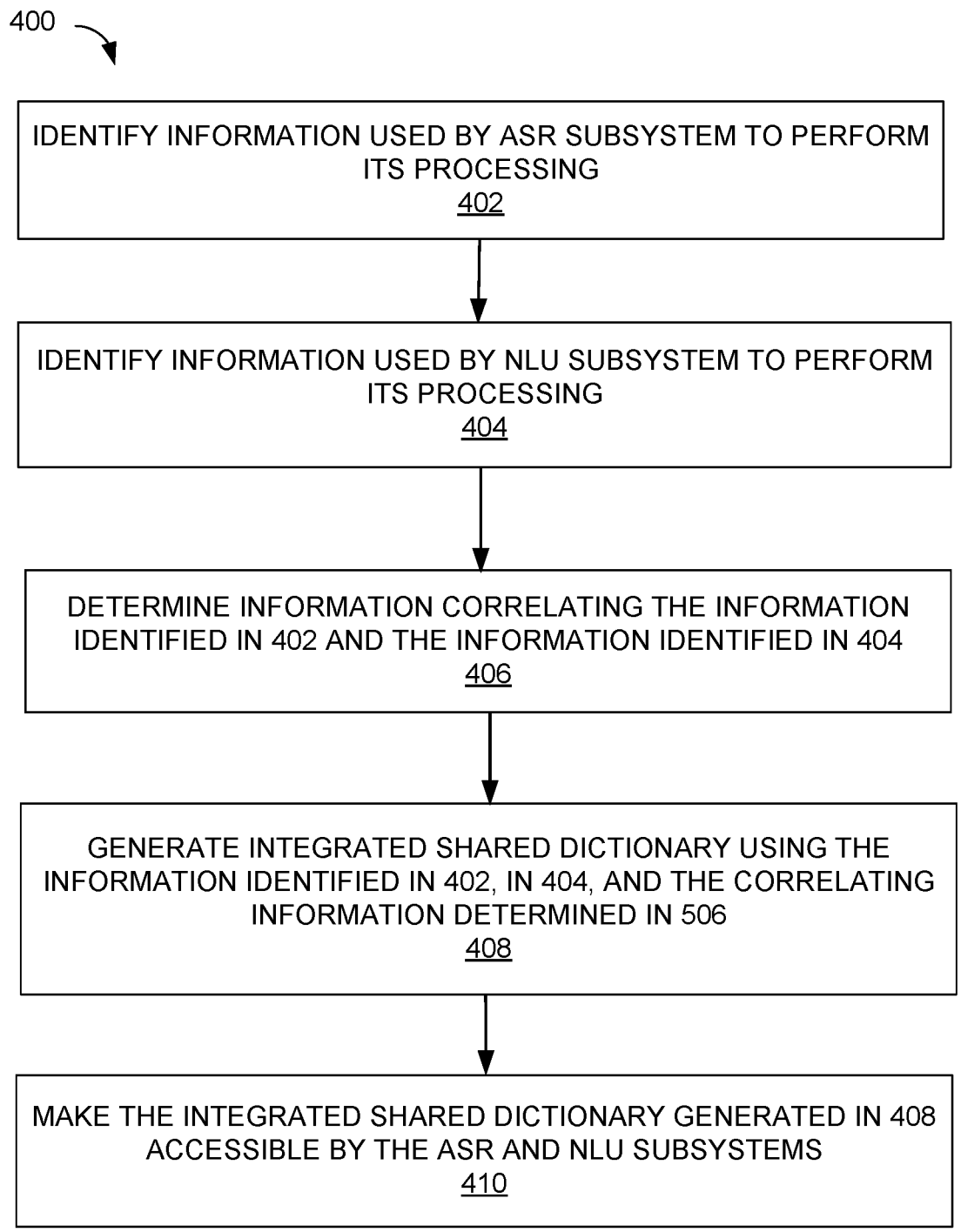
FIG. 4 is a simplified flowchart illustrating a method for generating a shared ASR/NLU dictionary according to certain embodiments.

FIG. 4 is a simplified flowchart illustrating a method 400 for generating an integrated shared dictionary according to certain embodiments. The method 400 may be performed by the ASR subsystem 108 and NLU subsystem 110 of the dialog system 100, in cooperation with other components of the dialog system 100 as depicted in FIG. 1. The processing depicted in FIG. 4 may be implemented in software only (e.g., code, instructions, program) executed by one or more processing units (e.g., processors, cores) of the respective systems, in hardware, or combinations thereof. The software may be stored on a non-transitory computer-readable memory (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In the processing described with respect to FIG. 4, the dialog system identifies various information for constructing the integrated shared dictionary. Identifying the information may achieved in a number of ways such as consulting configuration files prepared by an administrator, crawling the web, searching a database, and/or applying a machine learning model.

At 402, the dialog system identifies information used by the ASR subsystem to perform its processing. The ASR subsystem performs functions such as identifying words based on pronunciations. Accordingly, information used by the ASR subsystem to perform its processing includes identifying pronunciations corresponding to different words. The system identifies a set of words and corresponding pronunciations (e.g., as shown in FIG. 3A, words 302 include Sydney Harbour Bridge 308, which corresponds to the pronunciation 304 SIDNI. HAABA . BRIDG 310).

At 404, the dialog system identifies information used by the NLU subsystem to perform its processing. The NLU subsystem performs functions such as named entity recognition. Accordingly, the information used by the NLU subsystem to perform its processing includes different words or sets of words that correspond to a named entity, the corresponding type of named entity, and/or supplemental information about the named entity. For example, the set of words "Sydney Harbor Bridge" corresponds to a named entity of named entity type Point-of-Interest, as illustrated in FIG. 3A.

At 406, the dialog system determines information correlating the information identified in 402 and the information identified in 404. In some embodiments, the common word(s) identified at 402 and 404 is the correlating information that provides the mapping. For example, since the words Sydney Harbor Bridge map to both the pronunciation SIDNI . HAABA . BRIDG and the named entity type point-of-interest, the common words correlate the pronunciations, words, and named entity types with one another. The dialog system may search the information obtained at 402 and at 404 to determine matching sets of words, and/or sets of words that have a threshold level of similarity with one another, to determine the correlating information.

At 408, the dialog system generates an integrated shared dictionary using the information identified in 402, in 404, and the correlating info determined in 406. The dialog system can generate the integrated shared dictionary by storing the information in an organized fashion. The dialog system may map the pronunciations to the words, and map the words to information for use in identifying a meaning representation, such as a named entity type. In some embodiments, this can be done by storing the words, pronunciations, and named entity types in association with another in a table, as illustrated in FIGS. 3A and 3B.

At 410, the dialog system makes the integrated shared dictionary generated in 408 accessible and sharable by the ASR and NLU subsystems. The dialog system configures the ASR subsystem to use the integrated shared dictionary for processing. The dialog system configures the NLU subsystem to use the integrated shared dictionary for processing. For example, program code in the ASR and NLU subsystems may include instructions for retrieving information from the integrated shared dictionary. The ASR and/or NLU subsystems may further be configured to share information with one another to streamline use of the integrated shared dictionary (e.g., the ASR subsystem can communicate a pointer to information in the integrated shared dictionary to the NLU subsystem). The dialog system may further configure the integrated shared dictionary so that it may be used concurrently by the ASR and NLU subsystems.

Figure 5:
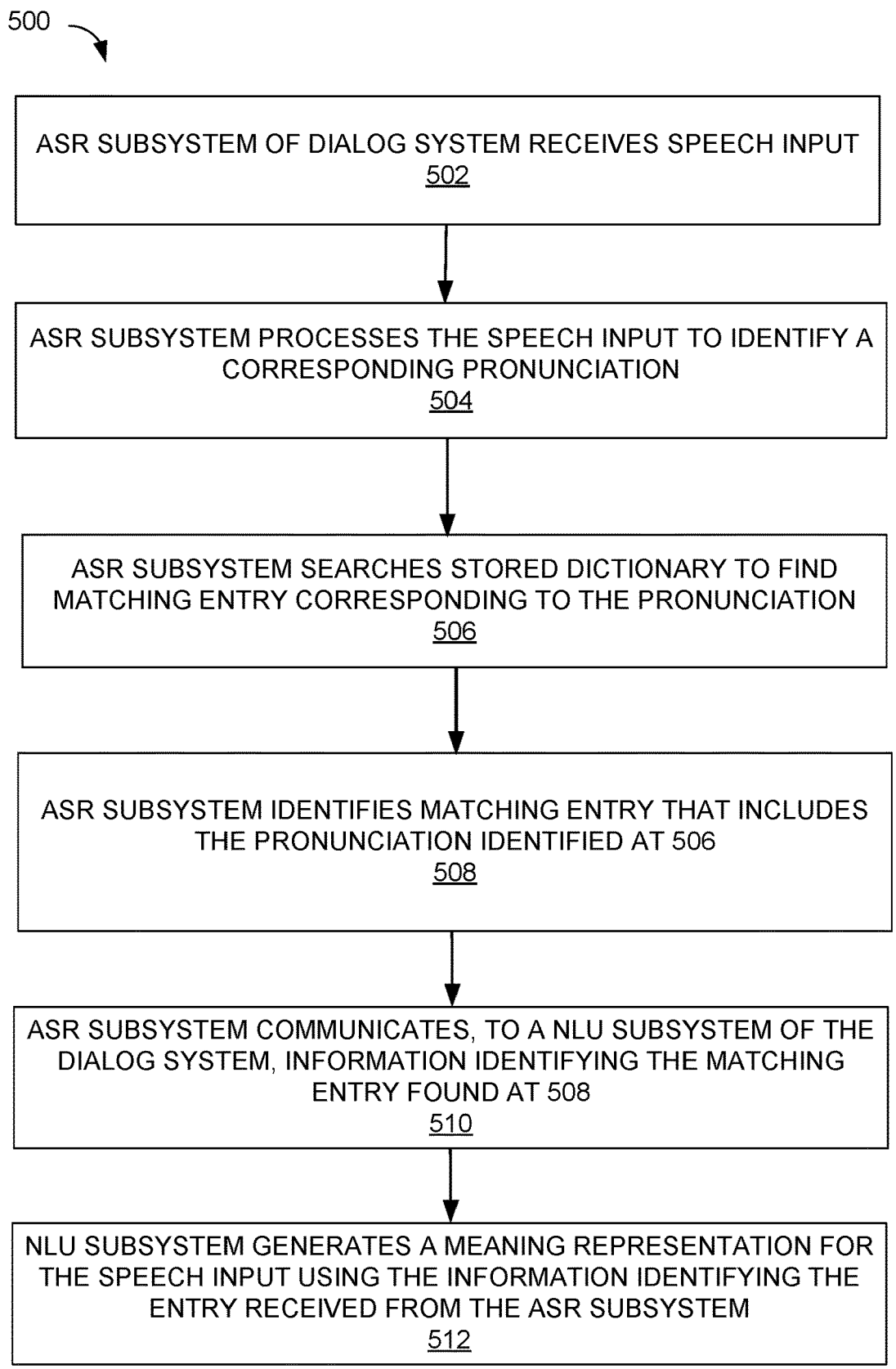
FIG. 5 is a simplified flowchart illustrating a method for streamlining processing in a dialog system using integrated and shared resources according to certain embodiments.

FIG. 5 is a simplified flowchart illustrating a method 500 for streamlining processing in a dialog system using integrated and shared resources according to certain embodiments. The method 500 may be performed by the ASR subsystem 108 and NLU subsystem 110 of the dialog system 100, in cooperation with other components of the dialog system 100 as depicted in FIGS. 1-3B. The processing depicted in FIG. 5 may be implemented in software only (e.g., code, instructions, program) executed by one or more processing units (e.g., processors, cores) of the respective systems, in hardware, or combinations thereof. The software may be stored on a non-transitory computer-readable memory (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

At 502, the ASR subsystem of the dialog system receives speech input. The speech input may be received, directly or indirectly, from a user. For example, a user may speak near a microphone (e.g., speech input component 105). The speech input component may transmit a digital representation of the spoken speech to the ASR subsystem 108 (e.g., via the wake-word detection subsystem 106). The speech input may correspond to a user request, such as "Find flights to Sydney."

At 504, the ASR subsystem processes the speech input received at 502 to identify a pronunciation corresponding to the speech input. The ASR subsystem may process the speech input using a model to determine the most likely pronunciation of components of the speech input. The ASR subsystem may break the speech input into portions or frames. Each frame may be analyzed to determine the most likely pronunciation associated with the frame. This can be executed using a pronunciation model, which may be a machine learning model trained to match frames of sound to a phonetic sequence. Examples of suitable models include a Hidden Markov Model (HMM) and neural networks such as recurrent neural networks. (See, e.g., K. W. Church, *Phonological Parsing in Speech Recognition*, Kluwer Academic Publishers, Boston, 1987.; K. Yao and G. Zweig, *Sequence-to-Sequence Neural Net Models for Grapheme-to-Phoneme Conversion*, arXiv:1506.00196v3, 2015). The resulting pronunciation may be represented in different forms, such as using syllables, phones, and/or phonemes. For example, as illustrated in FIG. 3A, one example of a pronunciation representation is S I D N I . H AA B A . B R I G.

At 506, the ASR subsystem searches a dictionary stored in a memory to find a matching entry in the dictionary corresponding to the pronunciation determined at 504. The dictionary (e.g., the integrated shared dictionary shown in FIGS. 1-3B) includes a plurality of entries. Each entry in the plurality of entries stores a set of one or more words mapped to a pronunciation stored in the entry. Each entry in the plurality of entries further includes additional information usable for determining a meaning representation for the set of one or more words stored by the entry. As shown in the example illustrated in FIGS. 3A-3B, sets of one or more words (e.g., Empire State Building or Valhalla) are mapped to pronunciations and additional information useable for determining a meaning representation. The additional information may include named entity types (e.g., person, location, etc.), supplemental information describing the words (e.g., an address, a definition, etc.), and/or other information that the NLU subsystem can use to determine a meaning representation.

At 508, the ASR subsystem identifies the matching entry that includes the pronunciation identified at 506. The ASR subsystem may, for example, use a tabular dictionary as illustrated in FIG. 3A to select the entry corresponding to the determined pronunciation. The identified entry may map the pronunciation to one word (e.g., Texas) or a set of words that together convey something (e.g., San Antonio River Walk). Similarly, the ASR subsystem may identify, using the mappings in the entry, the additional information usable for determining the meaning representation for the set of one or more words stored by the entry. For example, the ASR subsystem traverses the table to select a corresponding part of the entry that stores a named entity type corresponding to the word(s). In some cases, the set of words in a given entry may map to one piece of additional information. For example, as shown in FIG. 3A, Sydney Harbor Bridge maps to the named entity type point-of-interest. In some cases, the set of words may map to multiple entries of information associated with the set of words. For example, as shown in FIG. 3B, the word Washington is present in three different entries and maps to three different named entity types, along with supplemental information corresponding to each respective named entity type).

At 510, the ASR subsystem communicates, to the NLU subsystem of the dialog system, information identifying the matching entry found at 508. The information identifying the matching entry may include a pointer to information in the dictionary. For example, the ASR subsystem outputs the set of words "John Coltrane," along with a pointer to a portion of the corresponding dictionary entry that specifies the named entity type, person, associated with the named entity John Coltrane. Alternatively, or additionally, the information identifying the matching entry may include the information in the dictionary entry (e.g., the information identifying the matching entry is the named entity type itself, person).

The information identifying the matching entry may, alternatively or additionally, include a pointer to supplemental information associated with the set of words and/or the supplemental information itself. As noted above at 508 and shown in FIG. 3B, the information associated with the set of words may include supplemental information (e.g., the supplemental information may explain that John Coltrane was a famous jazz musician). In some embodiments, the pointer may point to an entry with both the named entity type and the supplemental information. Alternatively, the pointer may point to an entry with the named entity type, which in turn points to an entry with the supplemental information. As another example, the output may include multiple pointers (e.g., one to a named entity type in a dictionary entry and another to supplemental information in a dictionary entry).

The ASR subsystem may transmit identified text to the NLU subsystem for processing. The identified text transmitted to the NLU subsystem may include the set of words identified in the dictionary. The identified text transmitted to the NLU subsystem may further include additional words identified by the ASR subsystem. For example, the ASR output for the spoken query "Who is John Coltrane?" might be "Who is <NER id=66/>", where "<NER id=66/>" is an ASR output token that points to the named entity gazette entry for "John Coltrane". The words "who" and "is" may have been identified by the ASR subsystem via the dictionary in a similar fashion as described above with respect to 508. Accordingly, the ASR subsystem of the dialog system may further identify, using the dictionary, a second set of words, and output, to the NLU subsystem of the dialog system, the second set of words. In some embodiments, the ASR subsystem transmits the first set of words in addition to the information associated with the set of words (e.g., "John Coltrane" and <NER id=66/>). Alternatively, the ASR subsystem may transmit the pointer while refraining from transmitting the first set of words.

At 512, the NLU subsystem generates a meaning representation for the speech input, using the information identifying the entry received from the ASR subsystem. The meaning representation is a computer-understandable interpretation of the meaning of the text received by the NLU subsystem, and may identify an intent associated with the speech input. The NLU subsystem may use text utterances received from the ASR subsystem, along with the additional information stored in the matching entry in the dictionary, to generate the meaning representation. For example, the NLU subsystem may use a received pointer to a named entity type to rapidly recognize a named entity. Techniques for generating the meaning representation are further described below with respect to FIG. 6.

In some embodiments, the ASR subsystem and the NLU subsystem leverage the integrated shared dictionary to perform ASR and NLU processing concurrently. For example, the ASR subsystem may perform a lookup for a particular pronunciation, and the NLU may access the integrated shared dictionary for its processing at the same time. The integrated shared dictionary can be shared by and used concurrently by the ASR and NLU subsystems of the dialog system.

Figure 6:
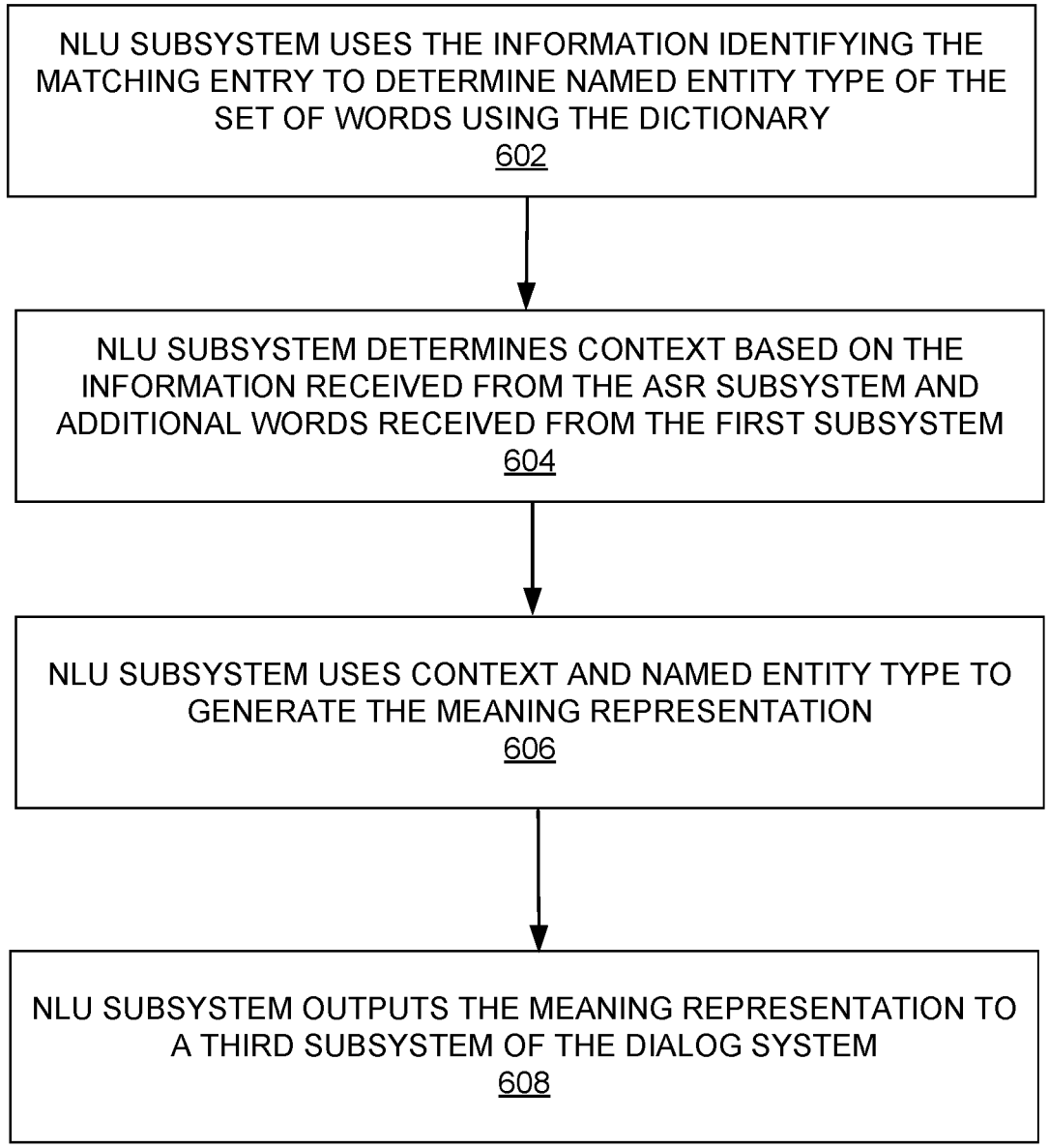
FIG. 6 is a simplified flowchart illustrating a method for generating the meaning representation of FIG. 5 according to certain embodiments.

FIG. 6 is a simplified flowchart illustrating a method 600 for generating the meaning representation of step 512 of FIG. 5, according to certain embodiments. The method 600 may be performed by the NLU subsystem 110 of the dialog system 100, in cooperation with other components of the dialog system 100 as depicted in FIGS. 1-3B. The processing depicted in FIG. 6 may be implemented in software only (e.g., code, instructions, program) executed by one or more processing units (e.g., processors, cores) of the respective systems, in hardware, or combinations thereof. The software may be stored on a non-transitory computer-readable memory. The method presented in FIG. 6 and described below is intended to be illustrative and non-limiting.

Although FIG. 6 depicts the various processing steps occurring in a particular sequence or order, this is not intended to be limiting. In certain alternative embodiments, the steps may be performed in some different order or some steps may also be performed in parallel.

At 602, the NLU subsystem (e.g., the NER subsystem 112 of the NLU subsystem 110) uses the received information identifying the matching entry to determine a named entity type of the set of words using the dictionary. For example, in the case that the identifying information communicated at 510 is a pointer to the dictionary entity for the named entity type, the NLU subsystem may use the pointer to identify the named entity type from the dictionary. As another example, in the case that the identifying information is the named entity type itself, the NLU subsystem may retrieve the received named entity type. The NLU subsystem may link the named entity type to the set of words, e.g., by tagging the text with information related to the identified named entity type. The NER subsystem 112 may feed the tagged text utterances to the semantic parser subsystem 114. As noted above, using these techniques, named entity linking can be achieved significantly faster than with prior techniques, as the NLU subsystem does not have to perform gazette lookup and can efficiently retrieve the named entity type using the received identifying information.

Because the dictionary includes both the words and the named entities, the system can efficiently identify named entities for any applicable words. For example, the dictionary entry for "Sydney Harbour Bridge" maps to the named entity type "point-of interest." Accordingly, the system links the identified word "Sydney Harbour Bridge" to the named entity type "point-of-interest." Some detected words may not map to a named entity type (e.g., directions, to, find, etc.).

Determining the named entity type may be executed by the NLU subsystem as a part of an overall NLU process which involves part-of-speech tagging of a larger set of words including the set of words associated with the named entity type. For example, the NLU subsystem may receive a sentence which includes nouns, verbs, and adjectives. The NLU subsystem labels words or groups of words with tags—noun, verb, adjective, and, for the named entity, the named entity type. This can be used in discerning the meaning of the larger set of words.

At 604, the NLU subsystem determines a context for the set of words based on the information received from the ASR subsystem and additional words received from the ASR subsystem. As noted above with respect to 510, the ASR subsystem may communicate to the NLU subsystem identifying information associated with a set of words. The ASR subsystem may further transmit to the NLU subsystem the set of words and/or additional sets of words (e.g., a second set of words, a third set of words, etc.). For example, the output of the ASR subsystem, received by the NLU subsystem, is "Take me to <NER id=27/>."<NER id=27/> is a pointer to the dictionary entry "Space Needle," which corresponds to a first set of words, Space Needle. "Take me to" is a second set of words. The NLU subsystem receives, from the ASR subsystem, the identifying information. The NLU subsystem may use the identifying information to identify the first set of words (e.g., by traversing the integrated shared dictionary to identify the words mapped to the information indicated by the received pointer). Alternatively, the ASR subsystem may transmit the first set of words and/or a pointer to first set of words to the NLU subsystem for direct retrieval.

To determine the context, the NLU subsystem (e.g., the semantic parser subsystem 112 of the NLU subsystem 110 of FIG. 1) may determine how the first set of the words and the second set of words relate to one another. For example, the NLU subsystem may execute dependency parsing operations to relate the sets of words to one another. (See, e.g., Danqi Chen and Christopher Manning, *A Fast and Accurate Dependency Parser Using Neural Networks*, Proceedings of EMNLP 2014 (2014)).

At 606, the NLU subsystem uses the context determined at 604 and the named entity type determined at 602 to generate the meaning representation. The NLU subsystem (e.g., the semantic parser subsystem 112 of the NLU subsystem 110 of FIG. 1) may use semantic parsing to generate a logical form corresponding to the meaning representation. Semantic parsing may be executed using a machine learning algorithm such as an RNN or chart parser. The resulting meaning representation may be in different forms such as lambda calculus, abstract meaning representation (AMR), or a Python or Java expression. (See, e.g., Liang, *Lambda Dependency-Based Compositional Semantics*, arXiv: 1309.4408 (2013); Yin and Neubig, *A Syntactic Neural Model for General-Purpose Code Generation*, arXiv: 1704.01696 (2017); Banarescu et al., *Abstract Meaning Representation for Sembanking*, Proceedings of 7th Linguistic Annotation Workshop (2013)).

In some embodiments, generating the meaning representation includes identifying an intent corresponding to the words. The system may use the identified words and to identify an action that the user is asking the system to perform. Intent classification may be performed using machine learning models. Appropriate models include neural networks, such as recurrent neural networks (e.g., gated recurrent units (GRUs)). The NLU subsystem may fill slots using the identified words (e.g., for a pizza order, slots may be assigned for the size and toppings of the pizza, and filled with corresponding words such as "large" and "pepperoni). As an example, the utterance "Directions to Joe's Coffee" can be used to generate the meaning representation Intent: Navigation, Destination: coordinates of nearest Joe's Coffee, Mode: driving.

At 608, the NLU subsystem outputs the meaning representation generated at 606 to a third subsystem of the dialog system. The third subsystem may be the dialog manager subsystem 116 shown in FIG. 1, or another suitable dialog system component. The third subsystem may then use the received meaning representation to generate a response. For example, the meaning representation represents a question asked by a user, and the third subsystem uses the meaning representation to arrive at an answer to the question.

In some embodiments, the NLU subsystem may output, to the third subsystem, a pointer to information about the set of words. For example, the NLU subsystem outputs a meaning representation to the third subsystem which includes a pointer (e.g., <SUP=/44>) that links to a dictionary entry that includes supplemental information describing the named entity "Valley Mall," such as the address of Valley Mall and the opening hours of Valley Mall. The third subsystem may then efficiently produce an answer by retrieving the supplemental answer for inclusion in the answer.

While the foregoing description has been provided using the ASR subsystem as a first subsystem of the dialog system and the NLU subsystem as a second subsystem of the dialog system, in other embodiments a dictionary can also be integrated and shared by other subsystems. For example, as described at 608, components for identifying information for inclusion in a response can also leverage the integrated shared dictionary for efficient dialog processing.

The infrastructure described above can be implemented in various different environments including a cloud environment (could be various types of clouds including private, public, and hybrid cloud environments), on-premises environment, a hybrid environment, and the like.

Figure 7:
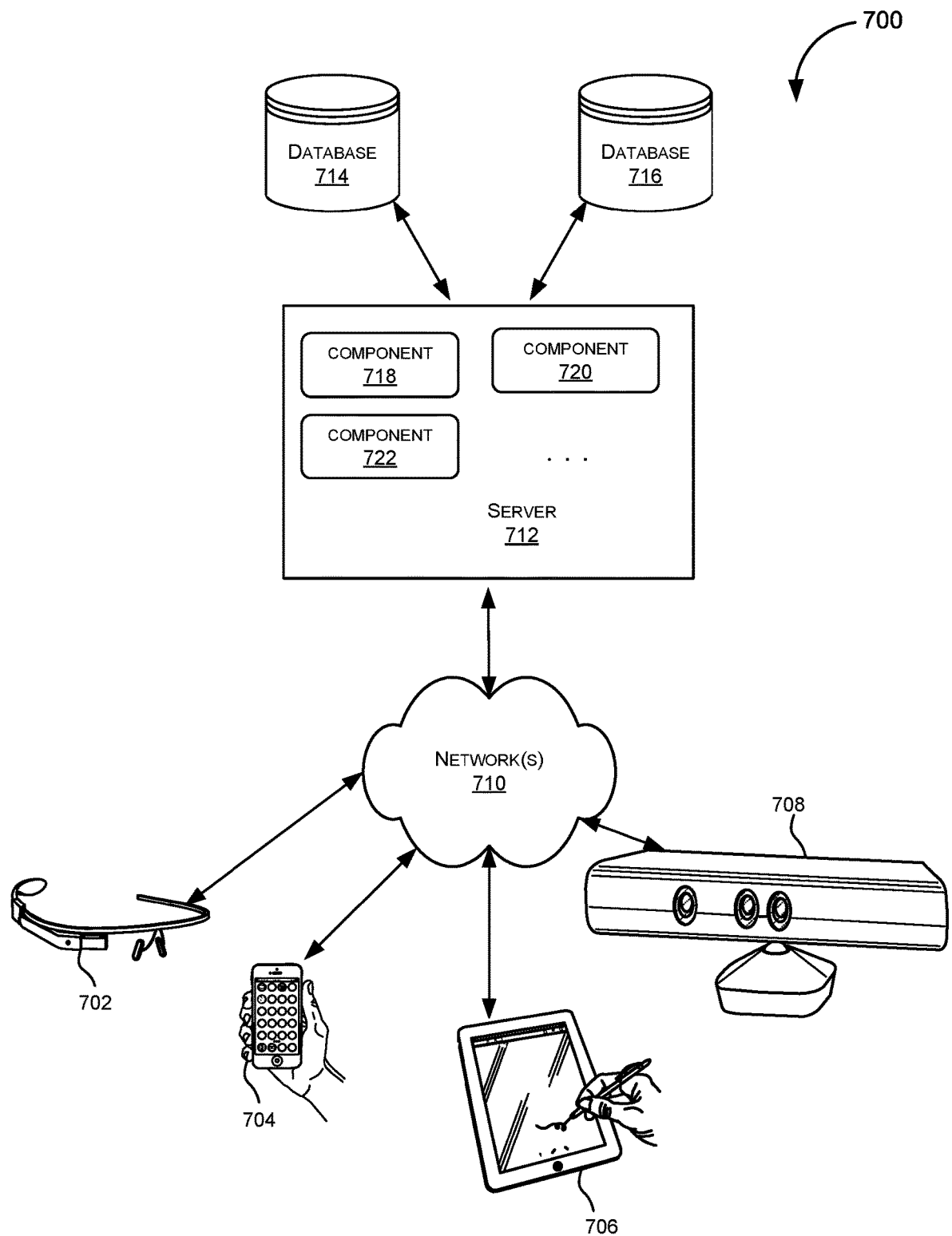
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable streamlined recognition of intent from speech input.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to use an integrated shared dictionary to identify a meaning representation based on speech input in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store information such as a dictionary used for both ASR and NLU. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
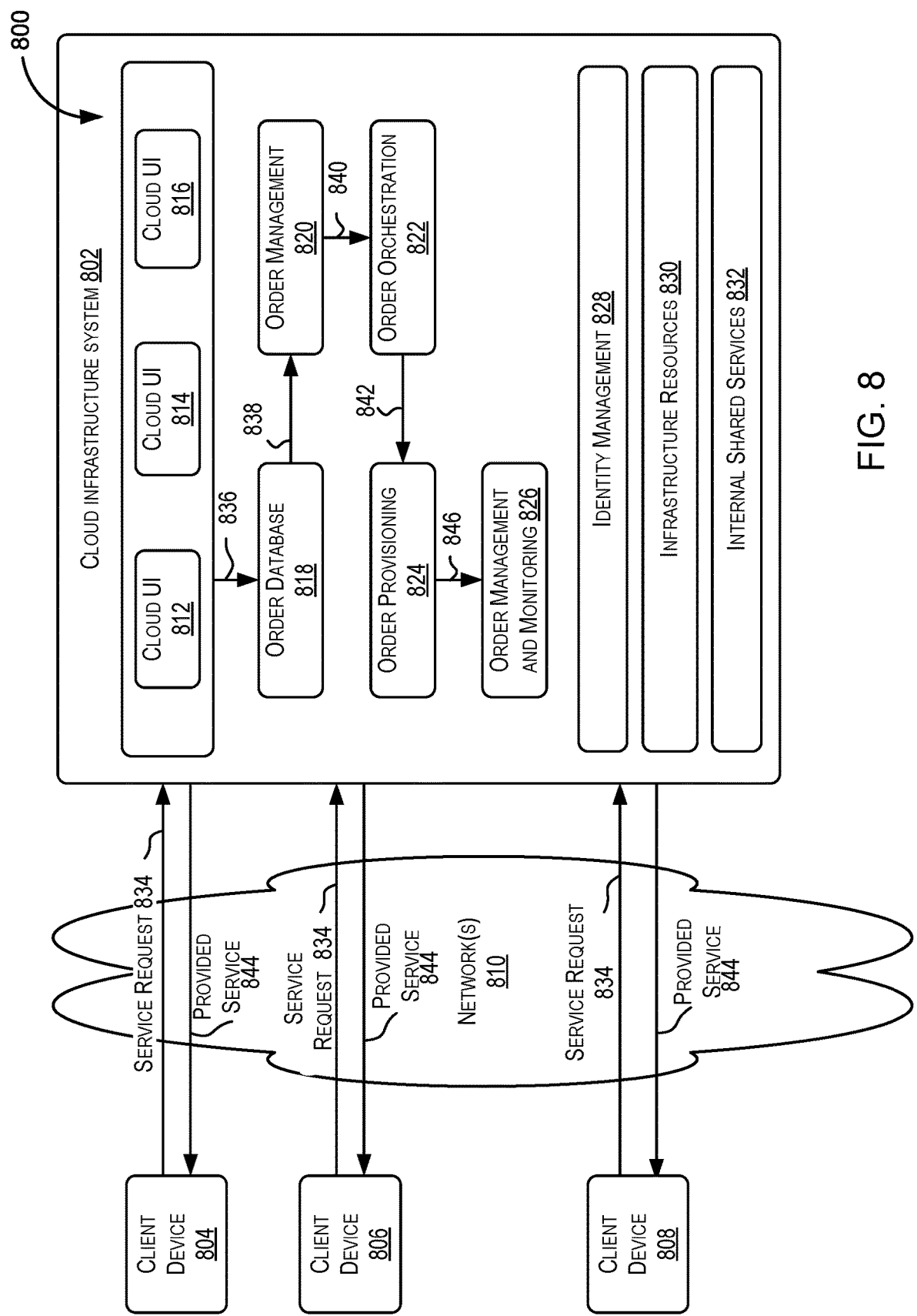
FIG. 8 is a simplified block diagram of a cloud-based system environment in which various storage-related services may be offered as cloud services, in accordance with certain embodiments.

In certain embodiments, the dialog-related functionalities described in this disclosure may be offered as services via a cloud environment. FIG. 8 is a simplified block diagram of a cloud-based system environment in which various dialog-related services may be offered as cloud services, in accordance with certain embodiments. In the embodiment depicted in FIG. 8, cloud infrastructure system 802 may provide one or more cloud services that may be requested by users using one or more client computing devices 804, 807, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 807, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, cloud infrastructure system 802 uses an integrated shared ASR/NLU dictionary to identify an intent based on received speech data. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request a dialog-related service described in this disclosure.

In some embodiments, the processing performed by cloud infrastructure system 802 for providing dialog-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining a meaning representation. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a dialog-related service offered by cloud infrastructure system 802. As part of the order, the customer may provide speech input identifying a request.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain embodiments, for a customer requesting the dialog-related service, the response may include a response generated based on an identified intent.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
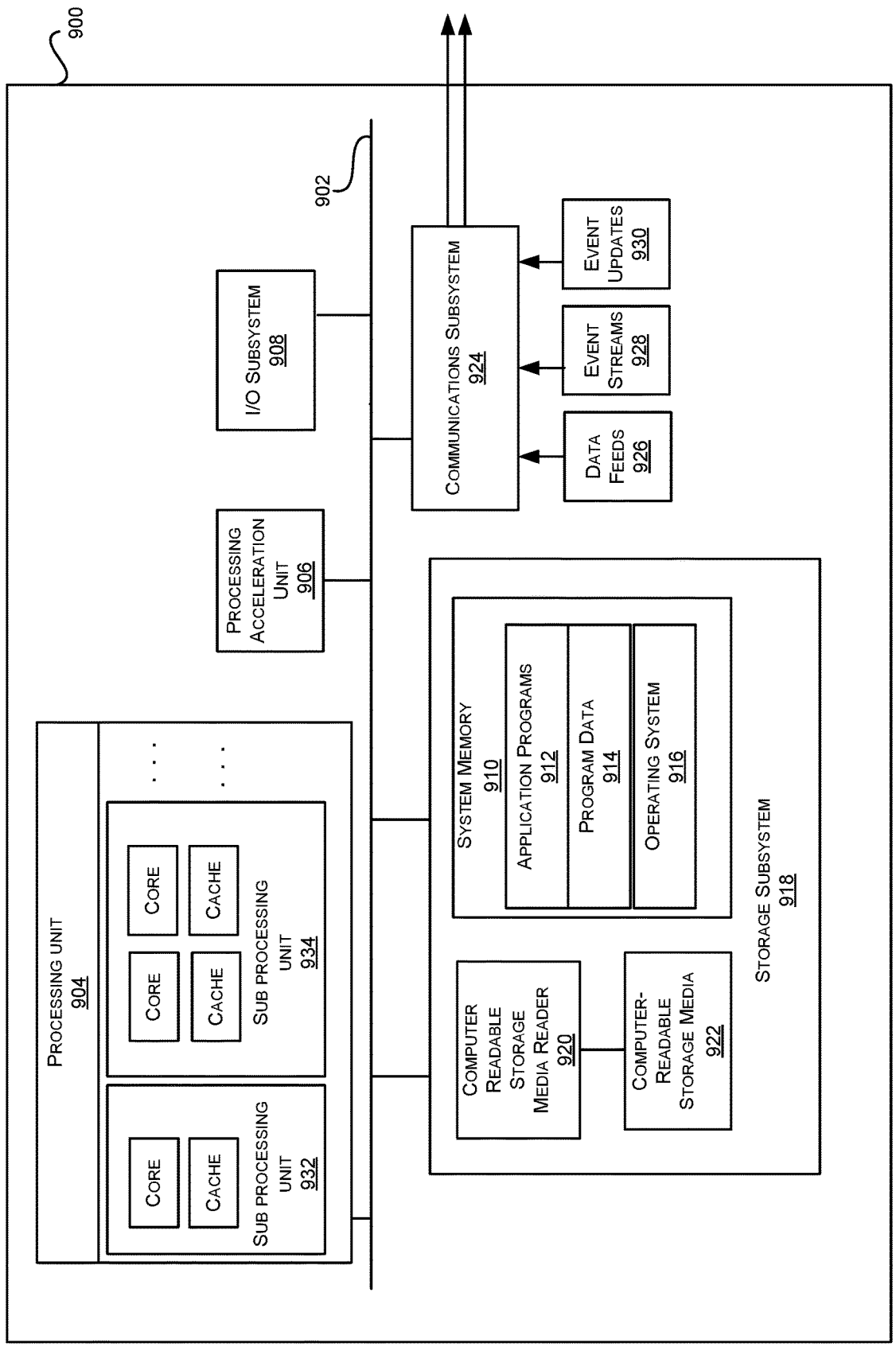
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of the ASR subsystem, NLU subsystem, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to communicate with a database to import updated training data for the ASR and/or NLU subsystems.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. In a dialog system implemented using one or more processors, a computer-implemented method comprising:
    receiving, by a first subsystem of the dialog system, speech input;
    processing, by the first subsystem, the speech input to identify a pronunciation corresponding to the speech input;
    searching, by the first subsystem, a shared dictionary stored in a memory to find a matching entry in the shared dictionary corresponding to the identified pronunciation, the shared dictionary comprising a plurality of entries, each entry in the plurality of entries storing a set of one or more words mapped to a pronunciation stored in the entry, each entry in the plurality of entries further comprising additional information usable for determining a meaning representation for the set of one or more words stored by the entry, the additional information for an entry in the plurality of entries comprising a named entity type corresponding to the set of one or more words stored by the entry and supplemental information describing the set of one or more words stored by the entry;
    communicating, by the first subsystem to a second subsystem of the dialog system, information identifying the matching entry, wherein the information identifying the matching entry comprises a pointer to the named entity type in the matching entry; and
    generating, by the second subsystem, a meaning representation for the speech input using the information identifying the matching entry, the meaning representation identifying an intent associated with the speech input, wherein the generating comprises retrieving, by the second subsystem, using the pointer, the named entity type stored in the matching entry in the shared dictionary and tagging the set of one or more words with the named entity type.

2. The method of claim 1, wherein:
the first subsystem is an Automated Speech Recognition (ASR) subsystem; and
the second subsystem is a Natural Language Understanding (NLU) subsystem.

3. The method of claim 1, wherein:
the set of words is a first set of words; and
the method further comprises:
    identifying, by the first subsystem of the dialog system using the dictionary, a second set of words;
    outputting, by the first subsystem of the dialog system to the second subsystem of the dialog system, the second set of words; and
    determining, by the second subsystem of the dialog system, a context by associating the words, of the first set of words and the second set of words, with one another using a machine learning model.

4. The method of claim 1, further comprising:
outputting, by the second subsystem of the dialog system to a third subsystem of the dialog system, the generated meaning representation.

5. The method of claim 1, further comprising:
identifying information used by the first subsystem;
identifying information used by the second subsystem;
determining information correlating the information used by the first subsystem and the information used by the second subsystem;
generating the dictionary used by the first subsystem, the information used by the second subsystem, and the correlating information; and
making the dictionary accessible by the first subsystem and the second subsystem.

6. A non-transitory computer-readable memory storing a plurality of instructions executable by one or more processors, the plurality of instructions comprising instructions that when executed by the one or more processors cause the one or more processors to perform processing comprising:
    receiving, by a first subsystem of a dialog system, speech input;
    processing, by the first subsystem, the speech input to identify a pronunciation corresponding to the speech input;
    searching, by the first subsystem, a shared dictionary stored in a memory to find a matching entry in the shared dictionary corresponding to the identified pronunciation, the shared dictionary comprising a plurality of entries, each entry in the plurality of entries storing a set of one or more words mapped to a pronunciation stored in the entry, each entry in the plurality of entries further comprising additional information usable for determining a meaning representation for the set of one or more words stored by the entry, the additional information for an entry in the plurality of entries comprising a named entity type corresponding to the set of one or more words stored by the entry and supplemental information describing the set of one or more words stored by the entry;
    communicating, by the first subsystem to a second subsystem of the dialog system, information identifying the matching entry, wherein the information identifying the matching entry comprises a pointer to the named entity type in the matching entry; and generating, by the second subsystem, a meaning representation for the speech input using the information identifying the matching entry, the meaning representation identifying an intent associated with the speech input, wherein the generating comprises retrieving, by the second subsystem, using the pointer, the named entity type stored in the matching entry in the shared dictionary and tagging the set of one or more words with the named entity type.

7. The non-transitory computer-readable memory of claim 6, wherein:
the first subsystem is an Automated Speech Recognition (ASR) subsystem; and
the second subsystem is a Natural Language Understanding (NLU) subsystem.

8. The non-transitory computer-readable memory of claim 6, wherein:
the set of words is a first set of words; and
the processing further comprises:
  identifying, by the first subsystem of the dialog system using the dictionary, a second set of words;
  outputting, by the first subsystem of the dialog system to the second subsystem of the dialog system, the second set of words; and
  determining, by the second subsystem of the dialog system, a context by associating the words, of the first set of words and the second set of words, with one another using a machine learning model.

9. The non-transitory computer-readable memory of claim 6, the processing further comprising:
outputting, by the second subsystem of the dialog system to a third subsystem of the dialog system, the generated meaning representation.

10. The non-transitory computer-readable memory of claim 6, the processing further comprising:
identifying information used by the first subsystem;
identifying information used by the second subsystem;
determining information correlating the information used by the first subsystem and the information used by the second subsystem;
generating the dictionary used by the first subsystem, the information used by the second subsystem, and the correlating information; and
making the dictionary accessible by the first subsystem and the second subsystem.

11. A dialog system comprising:
one or more processors;
a memory coupled to the one or more processors, the memory storing a plurality of instructions executable by the one or more processors, the plurality of instructions comprising instructions that when executed by the one or more processors cause the one or more processors to perform processing comprising:
receiving, by a first subsystem of the dialog system, speech input;
processing, by the first subsystem, the speech input to identify a pronunciation corresponding to the speech input;
searching, by the first subsystem, a shared dictionary stored in the memory to find a matching entry in the shared dictionary corresponding to the identified pronunciation, the shared dictionary comprising a plurality of entries, each entry in the plurality of entries storing a set of one or more words mapped to a pronunciation stored in the entry, each entry in the plurality of entries further comprising additional information_usable for determining a meaning representation for the set of one or more words stored by the entry, the additional information for an entry in the plurality of entries comprising a named entity type corresponding to the set of one or more words stored by the entry and supplemental information describing the set of one or more words stored by the entry;
communicating, by the first subsystem to a second subsystem of the dialog system, information identifying the matching entry, wherein the information identifying the matching entry comprises a pointer to the named entity type in the matching entry; and
generating, by the second subsystem, a meaning representation for the speech input using the information identifying the matching entry, the meaning representation identifying an intent associated with the speech input, wherein the generating comprises retrieving, by the second subsystem, using the pointer, the named entity type stored in the matching entry in the shared dictionary and tagging the set of one or more words with the named entity type.

12. The dialog system of claim 11, wherein:
the first subsystem is an Automated Speech Recognition (ASR) subsystem; and
the second subsystem is a Natural Language Understanding (NLU) subsystem.

13. The dialog system of claim 11, the processing further comprising:
outputting, by the second subsystem of the dialog system to a third subsystem of the dialog system, the generated meaning representation.

14. The dialog system of claim 11, the processing further comprising:
identifying information used by the first subsystem;
identifying information used by the second subsystem;
determining information correlating the information used by the first subsystem and the information used by the second subsystem;
generating the dictionary used by the first subsystem, the information used by the second subsystem, and the correlating information; and
making the dictionary accessible by the first subsystem and the second subsystem.

* * * * *

UNITED STATES PATENT AND TRADEMARK OFFICE
CERTIFICATE OF CORRECTION

| | |
|---|---|
| PATENT NO. | : 11,403,462 B2 |
| APPLICATION NO. | : 16/927357 |
| DATED | : August 2, 2022 |
| INVENTOR(S) | : Mark Edward Johnson |

It is certified that error appears in the above-identified patent and that said Letters Patent is hereby corrected as shown below:

On the Title Page

Column 1, under Other Publications, Lines 1-2, delete "forSembanking"," and insert
-- for Sembanking", --, therefor.

In the Specification

In Column 18, Line 59, delete "Mobile" and insert -- Mobile®, --, therefor.

In Column 25, Line 46, delete "Google)" and insert -- Google --, therefor.

Signed and Sealed this
Third Day of January, 2023

Katherine Kelly Vidal
*Director of the United States Patent and Trademark Office*